United States Patent
Dalsgaard et al.

(10) Patent No.: US 10,645,621 B2
(45) Date of Patent: May 5, 2020

(54) SMALL CELL OFFLOADING COMMAND

(71) Applicant: Nokia Technologies Oy, Espoo (FI)

(72) Inventors: Lars Dalsgaard, Oulu (FI); Jari Petteri Lunden, Espoo (FI); Elena Virtej, Espoo (FI)

(73) Assignee: Nokia Technologies Oy, Espoo (FI)

(*) Notice: Subject to any disclaimer, the term of this patent is extended or adjusted under 35 U.S.C. 154(b) by 170 days.

(21) Appl. No.: 14/779,370

(22) PCT Filed: Apr. 4, 2013

(86) PCT No.: PCT/IB2013/052716
§ 371 (c)(1),
(2) Date: Sep. 23, 2015

(87) PCT Pub. No.: WO2014/162172
PCT Pub. Date: Oct. 9, 2014

(65) Prior Publication Data
US 2016/0050598 A1     Feb. 18, 2016

(51) Int. Cl.
*H04W 36/06* (2009.01)
*H04W 36/04* (2009.01)
(Continued)

(52) U.S. Cl.
CPC ....... *H04W 36/04* (2013.01); *H04W 36/0027* (2013.01); *H04W 36/0055* (2013.01); *H04W 76/28* (2018.02); *H04W 84/045* (2013.01)

(58) Field of Classification Search
CPC ............. H04W 36/0055; H04W 36/04; H04W 84/045; H04W 36/0027; H04W 76/048; H04W 76/28
See application file for complete search history.

(56) References Cited

U.S. PATENT DOCUMENTS

| | | | | |
|---|---|---|---|---|
| 2004/0170191 A1* | 9/2004 | Guo | ................. | H04W 36/0088 370/468 |
| 2008/0008127 A1* | 1/2008 | Choi | ................... | H04J 11/0069 370/331 |

(Continued)

FOREIGN PATENT DOCUMENTS

| | | |
|---|---|---|
| CN | 102469557 A | 5/2012 |
| WO | 2006055784 | 5/2006 |

(Continued)

OTHER PUBLICATIONS

Nokia et al., R2-115731, HetNet mobility and DRX, 3GPP TSG-RAN WG2 Meeting #75bis, whole document.*

(Continued)

*Primary Examiner* — Un C Cho
*Assistant Examiner* — Jose L Perez
(74) *Attorney, Agent, or Firm* — Mintz Levin Cohn Ferris Glovsky and Popeo, P.C.

(57) ABSTRACT

A method includes, when operating in a connected state in a first cell such as a macro cell, reporting a presence of a second cell such as a small cell to the macro cell; receiving a first offloading command; storing connected state context information associated with the macro cell; establishing a connected state with the small cell; storing connected state context information associated with the small cell; performing at least one data offloading operation with the small cell and, upon a termination of data offloading operation, reestablishing the connected state with the macro cell using the stored connected state context information associated with the macro cell.

18 Claims, 6 Drawing Sheets

(51) Int. Cl.
*H04W 76/28* (2018.01)
*H04W 36/00* (2009.01)
*H04W 84/04* (2009.01)

(56) References Cited

U.S. PATENT DOCUMENTS

| | | | | |
|---|---|---|---|---|
| 2009/0042536 | A1* | 2/2009 | Bernard | H04W 36/18 455/406 |
| 2011/0294508 | A1* | 12/2011 | Min | H04W 36/0083 455/436 |
| 2012/0129527 | A1* | 5/2012 | Takeuchi | H04W 36/20 455/436 |
| 2012/0172043 | A1* | 7/2012 | Chin | H04W 36/08 455/436 |
| 2012/0282932 | A1* | 11/2012 | Yu | H04W 84/005 455/437 |
| 2013/0034080 | A1* | 2/2013 | Yang | H04W 36/0005 370/331 |
| 2013/0077482 | A1 | 3/2013 | Krishna et al. | |
| 2013/0195078 | A1* | 8/2013 | Kobayashi | H04W 36/0055 370/331 |
| 2013/0308527 | A1* | 11/2013 | Chin | H04W 36/0022 370/328 |
| 2014/0198767 | A1* | 7/2014 | Heo | H04W 36/023 370/331 |
| 2014/0256311 | A1* | 9/2014 | Muller | H04W 36/0055 455/424 |
| 2014/0349659 | A1* | 11/2014 | Ishii | H04W 76/10 455/444 |
| 2015/0045029 | A1* | 2/2015 | Dalsgaard | H04W 36/0083 455/436 |
| 2015/0131615 | A1* | 5/2015 | Miklos | H04W 36/0011 370/331 |

FOREIGN PATENT DOCUMENTS

| | | |
|---|---|---|
| WO | 2013/038052 A1 | 3/2013 |
| WO | 2014/065828 A1 | 5/2014 |

OTHER PUBLICATIONS

Nokia et al., R2-115731, HetNet mobility and DRX, Oct. 10, 2011, 3GPP TSG-RAN WG2 Meeting #75bis, whole document (Year: 2011).*

International Search Report and Written Opinion received for corresponding Patent Cooperation Treaty Application No. PCT/IB2013/052716, dated Feb. 21, 2014, 17 pages.
3GPP Draft R-2-130043, "Discussion on Small Cell Enhancement—dual connectivity", Pantech, Jan. 19, 2013, 3rd Generation Partnership Project (3GPP), Mobile Competence Centre; 650, route des Lucioles; F-06921 Sophia-Antipolis Cedex, France.
3GPP TS 36.300v11.5.0"3rd Generation Partnership Project; Technical Specification Group Radio Access Network; Evolved Universal Terrestrial Radio Access (E-UTRA) and Evolved Universal Terrestrial Radio Access Network (E-UTRAN); overall description; Stage 2 (Release 11)", 3rd Generation Partnership Project (3GPP), Mar. 18, 2013, Mobile Competence Centre; 650, route des Lucioles; F-06921 Sophia-Antipolis Cedex, France.
"TR 36.842 V0.1.0 on Study on Small Cell Enhancements for EUTRA and E-UTRAN—Higher-Layer Aspects", 3GPP TSG-RAN WG2 #81, R2-130845, Agenda Item: 7.2, Ntt Docomo Inc., Jan. 28-Feb. 1, 2013, 9 pages.
"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331, V11.2.0, Dec. 2012, pp. 1-340.
"3rd Generation Partnership Project;Technical Specification Group Radio Access Network;Evolved Universal Terrestrial Radio Access (E-UTRA);Requirements for support of radio resource management(Release 11)", 3GPP TS 36.133, V11.3.1, Jan. 2011.
"3rd Generation Partnership Project; Technical Specification Group Radio Access Network; Evolved Universal Terrestrial Radio Access (E-UTRA); Small Cell Enhancements for E-UTRA and E-UTRAN—Higher layer aspects (Release 12)", 3GPP TR 36.842, V0.1.0, Feb. 2013, pp. 1-8.
Extended European Search Report received for corresponding European Patent Application No. 13880791.2, dated Aug. 22, 2016, 10 pages.
"Discussion on Minimizing UE Context Transfer and Signalling to CN", 3GPP TSG-RAN2 Meeting #81, R2-130572, Agenda Item: 7.2, Intel Corporation, Jan. 28-Feb. 1, 2013, 5 pages.
"Miscellaneous Corrections to TS 36.300 on Carrier Aggregation", 3GPP TSG-RAN WG2 Meeting #73, R2-110976, Potevio, Feb. 21-25, 2011, 9 pages.
3GPP, "Technical Specification Group Radio Access Network; Evolved Universal Terrestrial Radio Access (E-UTRA); Mobility enhancements in heterogeneous networks (Release 11)," 3rd Generation Partnership Project, 3GPP TR 36.839 V11.1.0, Dec. 2012.

* cited by examiner

SMALL CELL OFFLOADING COMMAND

RELATED APPLICATION

This application was originally filed as PCT Application No. PCT/IB2013/052716 filed Apr. 4, 2013.

TECHNICAL FIELD

The exemplary and non-limiting embodiments of this invention relate generally to wireless communication systems, methods, devices and computer programs and, more specifically, relate to heterogeneous network (HetNet) deployments, handoff or handover (HO), discontinuous reception (DRX) and connected mode operations of a user equipment (UE) in a HetNet.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

HetNet mobility enhancements have been an ongoing study item for some time. One focus of this effort has been an improvement in network deployments in which there is a mix of macro cells (e.g., conventional large area cellular network cells supported by a base station (BS) or a NodeB or an evolved NodeB (eNB)) and small cells (e.g., pico-cells). For Release 12 (Rel-12) 3GPP has also begun to consider small cell enhancements that can overlap to some extent HetNet technologies and procedures.

The presence of network deployments in which there can be a mix of macro cells and small cells, operating either on the same carrier or on a different carrier as a serving (macro) cell, introduces challenges with respect to at least mobility performance, load balancing and offloading.

SUMMARY

The foregoing and other problems are overcome, and other advantages are realized, in accordance with the exemplary embodiments of this invention.

In a first aspect thereof the examples of the embodiments of this invention provide a method that comprises, when operating in a connected state in a first cell; receiving a first offloading command from the first cell; storing connected state context information associated with the first cell; establishing a connected state with a second cell; and performing at least one data offloading operation comprising at least one of transmitting and receiving data with the second cell.

In a second aspect thereof the examples of the embodiments of this invention provide an apparatus that comprises a processor and a memory that includes computer program code. The memory and computer program code are configured, with the processor, to cause the apparatus at least to perform operations, when operating in a connected state in a first cell; receiving a first offloading command from the first cell; storing connected state context information associated with the first cell; establishing a connected state with a second cell; and performing at least one data offloading operation comprising at least one of transmitting and receiving data with the second cell.

In a further aspect thereof the examples of the embodiments of this invention provide a method that comprises, when operating in a connected state in a macro cell with a user equipment, receiving a report of a presence of a small cell from the user equipment; in response to a determined need for the user equipment to perform a data offloading operation, storing connected state context information associated with the user equipment; sending a first offloading command to the user equipment and, upon a termination of at least one data offloading operation performed by the user equipment with the small cell, re-establishing the connected state with the user equipment using the stored connected state context information associated with the user equipment.

In a still further aspect thereof the examples of the embodiments of this invention provide an apparatus that comprises a processor and a memory that includes computer program code. The memory and computer program code are configured, with the processor, to cause the apparatus at least to perform operations of, when operating in a connected state in a macro cell with a user equipment, receiving a report of a presence of a small cell from the user equipment; in response to a determined need for the user equipment to perform a data offloading operation, storing connected state context information associated with the user equipment; sending a first offloading command to the user equipment and, upon a termination of at least one data offloading operation performed by the user equipment with the small cell, re-establishing the connected state with the user equipment using the stored connected state context information associated with the user equipment.

In another aspect thereof the examples of the embodiments of this invention provide a method that comprises, when operating in a small cell with a user equipment, and in response to the user equipment establishing a first connected state with the small cell, storing connected state context information associated with the user equipment; performing a first offloading operation with the user equipment and, upon a termination of the first offloading operation and a termination of the first connected state, and in response to the user equipment attempting to establish a second connected state with the small cell to perform a second offloading operation, re-establishing the connected state with the user equipment using the stored connected state context information associated with the user equipment.

In yet one further aspect thereof the examples of the embodiments of this invention provide an apparatus that comprises a processor and a memory that includes computer program code. The memory and computer program code are configured, with the processor, to cause the apparatus at least to perform operations of, when operating in a small cell with a user equipment and in response to the user equipment establishing a first connected state with the small cell, an operation of storing connected state context information associated with the user equipment; an operation of performing a first offloading operation with the user equipment and, upon a termination of the first offloading operation and a termination of the first connected state, and in response to the user equipment attempting to establish a second connected state with the small cell to perform a second offloading operation, an operation of re-establishing the connected state with the user equipment using the stored connected state context information associated with the user equipment.

BRIEF DESCRIPTION OF THE DRAWINGS

The foregoing and other aspects of the exemplary embodiments of this invention are made more evident in the following Detailed Description, when read in conjunction with the attached Drawing Figures, wherein.

DETAILED DESCRIPTION

Figure 1:
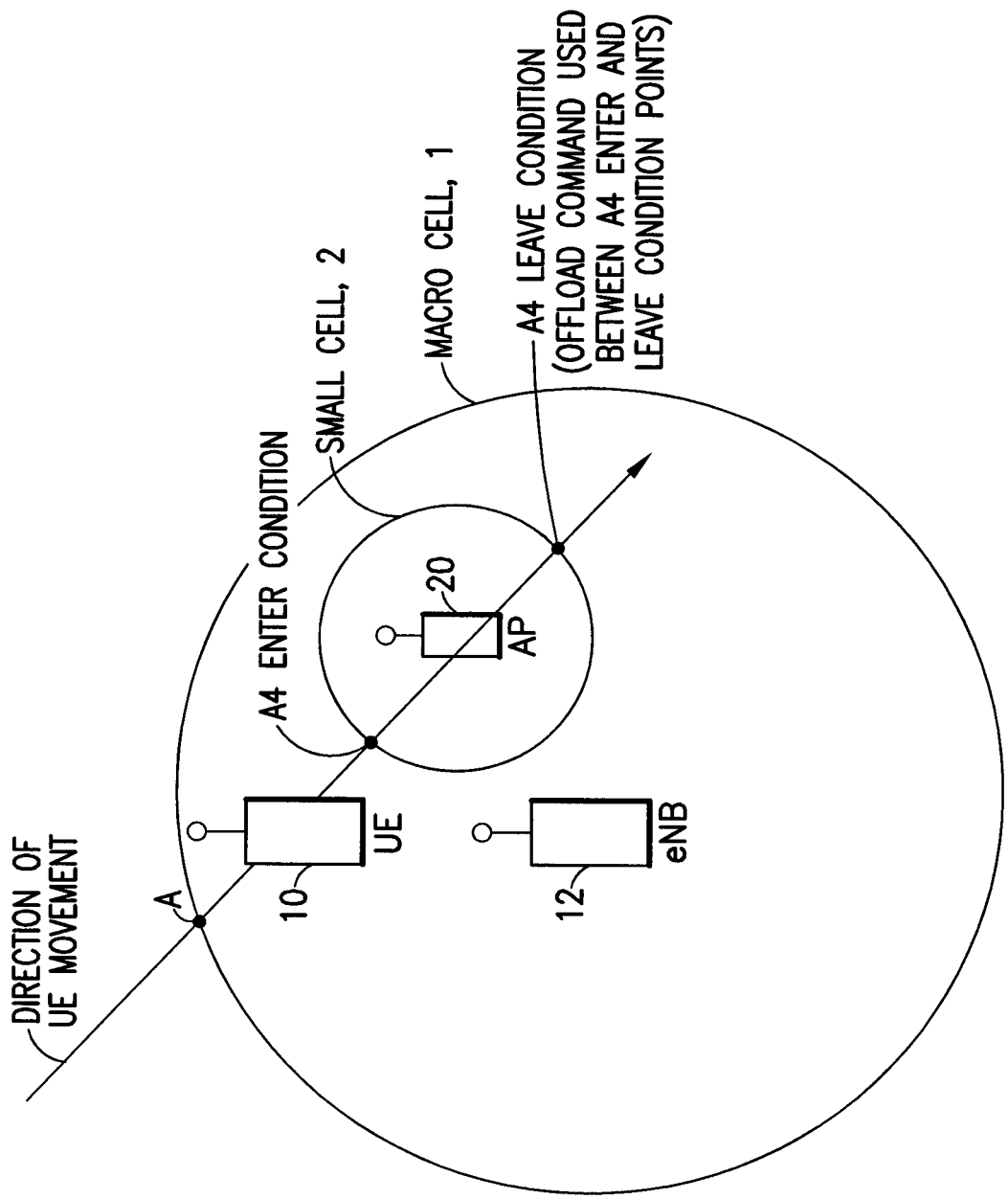
FIG. 1 presents an exemplary use case, where a macro cell and a small cell are deployed on two different frequencies (i.e., an inter-frequency case), and is useful for explaining the embodiments of this invention.

For the purposes of describing the embodiments of this invention a "small cell" can be a picocell. A picocell may be considered as small cellular base station that typically covers a limited area such as within a building (e.g., an office building) or within a vehicle (e.g., a train). In cellular networks picocells are typically used to extend the network coverage to indoor areas where signals from the macro cell are too attenuated to provide robust UE operation, or to add network capacity in those areas (e.g., urban public places such as train stations, sporting venues such as football stadiums, etc.) having a dense concentration of UEs. Picocells can provide enhanced coverage and capacity in those areas that are difficult or too expensive to reach using traditional macro cells. In addition to picocell, the small cell can be also, e.g., a femtocell, home eNB, a cell with limited access rights (closed subscriber group or hybrid access), or it may be a cell that has limited capacity or a higher latency backhaul.

The examples of the embodiments of this invention address the issues of load balancing and offloading of a data load efficiently between macro cells and small cells while using minimized signaling with low latency. Similar methods can be used also between, e.g., two small cells on different frequencies, or between macro cells.

Current radio access network 2 (RAN2) specifications enable movement of a connected mode UE between cells by use of a UE-assisted network controlled handover procedure. This means that the network configures the UE with a measurement configuration which inform/instructs the UE of which carriers to measure and how to evaluate events and report triggered events and related measurements to the network. The network may then use the measurement report received from the UE for performing a handover for whatever reason, e.g., either due to load balancing, interference management, or offloading purposes.

One challenge that has been recognized when deploying small cells is related to the issue of ensuring equally well functioning and robust network-based handover as is the typical case at the macro cell level. This is especially true for cases where the UE power consumption needs to be taken into account, and where the network applies connected mode DRX functionality for the UE.

The connected mode DRX enables a very efficient UE power saving potential for connected mode UEs by allowing UEs without active scheduling to turn off their receiver and transmitter chains during idle periods (no ongoing active data transmission) when in the connected mode. In that the UE measurement performance requirements are aligned with an applied DRX pattern in order to realize the full benefits of the power savings at the UE, the use of the connected mode DRX can possibly impact mobility reaction time. For example, the reaction time can be degraded by delaying the triggering of measurement reporting which in turn can result in a failed handover.

Observations that can be obtained from 3GPP TR 36.839 V11.1.0 (2012-12) *Technical Report* 3rd Generation Partnership Project; Technical Specification Group Radio Access Network; Evolved Universal Terrestrial Radio Access (E-UTRA); Mobility enhancements in heterogeneous networks (Release 11) can include the following.

(a) Simulations indicate that for low speed UEs (3 km/h) acceptable HO performance rates can be ensured at least for background traffic in HetNets if the network avoids too long DRX settings within pico cells.

(b) In general, while a longer DRX period combined with a higher UE velocity provides challenges to mobility robustness, when adding small cells in combination with the longer DRX period even medium velocity UEs can be challenged with regards to mobility robustness, especially for the case of picocell outbound mobility.

Some might conclude that in small cells it is only viable to use a rather short DRX period, or no DRX at all, in order to ensure mobility robustness in the small cell scenario (i.e., ensure that key performance indicators (KPIs) do not increase due to the deployment of small cells for load balancing or offloading). However, not using DRX would have a severe impact on UE power consumption if a UE stays in a small cell when in the connected mode.

Another challenge relates to the issue of increased handovers and the related signaling overhead, e.g., measurement reporting and handover commands. This is addressed in, for example, a skeleton technical report (TR) for Small Cell Enhancements (SCE) Higher Layer (R2-130845), 3GPP TR 36.842 V0.1.0 (2013-02) *Technical Report* 3rd Generation Partnership Project; Technical Specification Group Radio Access Network; Evolved Universal Terrestrial Radio Access (E-UTRA); Small Cell Enhancements for E-UTRA and E-UTRAN—Higher layer aspects (Release 12). Sections 5.1 and 5.2 are reproduced below.

5.1 Scenario #1

Scenario #1 is the deployment scenario where macro and small cells on the same carrier frequency (intra-frequency) are connected via non-ideal backhaul. In Scenario #1, the following challenges are expected:

a) Mobility robustness: In particular increased HOF/RLF upon mobility from pico to macro cells [4];

b) Difficult to improve system capacity by utilizing radio resources in more than one eNB (e.g. due to UL/DL imbalance issues);

c) Increased signalling load (e.g., to CN) due to frequent handover;
d) Difficult to improve per-user throughput by utilizing radio resources in more than one eNB;
e) Network planning and configuration effort;

5.2 Scenario #2

Scenario #2 is the deployment scenario where macro and small cells on different carrier frequencies (inter-frequency) are connected via non-ideal backhaul. In Scenario #2, the following challenges are expected:

a) Mobility robustness (not investigated in [4] and the problem of strong interference from macro on same carrier is not present);
b) Difficult to improve system capacity by utilizing radio resources in more than one eNB (e.g. due to UL/DL imbalance issues);
c) Increased signalling load (e.g., to CN) due to frequent handover;
d) Difficult to improve per-user throughput by utilizing radio resources in more than one eNB;
e) Network planning and configuration effort;
f) Small cell discovery;

Scenario 2 above relates to inter-frequency deployment of small cells (i.e., small cells are deployed on a carrier other than the carrier of the currently serving cell, e.g., macro cell). while scenario 1 refers to the intra-frequency case (i.e., small cells are co-channel deployed and thereby deployed on the same carrier frequency as the serving cell (e.g. macro cell)).

The embodiments of this invention provide solutions that allow efficient use of small cells for load balancing and/or offloading, while not compromising UE power saving opportunities and while also, if not reducing the signaling related to mobility, then at least not increasing the signaling related to mobility. Additionally the embodiments of this invention address and solve the problems related to offloading latency.

The various embodiments of the present invention take an approach in which the UE is connected to two cells (macro cell and small cell) and stores relevant connection-related information from both cells in order to enable fast switching. That is, instead of using a conventional 'hard' handover between such cells there is a 'lighter' procedure to offload the UE's connection to a small cell and to allow fast transitions to occur back and forth between the macro cell and the small cell. This transition can be repeated multiple times using light and fast signaling assuming that the UE remains within the coverage of the small cell (entry and leaving conditions).

One non-limiting aspect of the embodiments of this invention is to introduce a new command that can be referred to for convenience, and not as a limitation, as an "offloading" command. An offloading command can resemble in some respects a handover command but in addition to the conventional handover command it enables the UE to change to a (small) cell to, for example, offload traffic to the small cell while maintaining a current macro cell connection. That is, the offloading command does not initiate a conventional hard handover to the small cell per se, where the UE context would be removed at the macro cell after some predetermined period of time after leaving the macro cell.

When the offloading command is used both the network, e.g., the network macro cell access node such as an eNB, and the UE store the UE context from the macro cell. This UE context contains information necessary to resume connection between the UE and the macro cell eNB. Additionally the network may also reserve resources for the UE when UE is offloaded to another cell. This enables a subsequent fast switching transition between the macro cell and the small cell (and vice versa). When an offloading command is received the UE is made aware that it needs to store the necessary information related to the macro cell connection. The UE may also store information related to the small cell (the handover target) connection to be used, e.g., for potential later offloading to the same small cell.

The connection/data can then be offloaded back and forth to the small cell on an as-needed basis, such as when there is need for larger capacity, e.g., downloading a file or updating emails, etc. This re-occurring offloading scheme can be accomplished using a much reduced network signaling overhead than would be required when using a conventional handover command.

Additionally the offloading command can be used to enable efficient and robust mobility operations for those cases where the picocell outbound mobility would otherwise potentially be unsuccessful, such as when a radio link failure (RLF) occurs during the picocell outbound HO, as the UE would still have an active connection to the macro cell.

By enabling faster cell changes through the use of the offloading command the UE would not need to be in the small cell during connected mode idle periods (during DRX periods), but only during those periods when active data transmission is occurring in the small cell (e.g., when downloading a data file to the UE when located in the coverage area associated with a picocell or when uploading a data file when in the picocell coverage area). When the active data reception and/or transmission terminates the UE can rapidly transition back to the macro cell without needing to enter the DRX mode while in the small cell.

FIG. 1 presents an exemplary use case, where a macro cell 1 and a small cell 2 are deployed on two different frequencies (i.e., the inter-frequency case). The embodiments of this invention provide a new or modified handover-like command referred to above as the offloading command. The offloading command when used functions as a trigger to cause both a UE 10 and the network, e.g., an eNB 12, associated with the macrocell 1 to store the necessary context of both the source cell (here the macro cell 1) and the target cell (here the small cell 2). Associated with the target cell 2 is a small cell base station or NodeB or eNB or HeNB (home eNB) or simply access node or access point (AP) 20.

It can be noted that while for convenience one small cell 2 is shown located within the coverage area of the much larger macro cell 1, in practice there could be several or many small cells 2 present within the macro cell 1. Moreover, there could be more than one macro cell coverage area overlapping the coverage area of a small cell.

The offload command includes inbound HO information with an indication that the UE 10 should store current serving cell information. The macro cell 1, e.g., the eNB 12, stores UE context and the UE 10 does the same. The context that is stored/saved can include, for example, the cell radio network temporary identifier (C-RNTI), the UE uplink (UL) timing parameters, security information, etc. In some embodiments of this invention certain measurement and DRX configurations could be stored for the two states, where the UE 10 automatically switches between these configurations when offloaded. In general the UE context can be considered to include any information that is needed by the UE and the network (the macro cell network or small cell network) in order to quickly resume a connection with the UE 10 (i.e., without requiring additional configuration of parameters). The exact content of the UE context could thus differ between different macro cell/small cell types and embodiments and deployments.

The information that the UE 10 (and the eNB 12) store in connection with using the offloading command can be just the UE context, but is not limited to just the UE context. For example other information related to the cells can be stored as well such as system information blocks (SIBs), measurement configurations, and any other relevant context information needed to quickly re-establish a connection to a cell, without requiring a costly reconfiguring/updating of connection and other parameters.

After receiving the offloading command the UE 10 changes or hands-over to the target cell. However, the source eNB 12 (macro cell) and the UE 10 and the target cell (small cell 2) will continue to store the relevant connection context for the UE 10.

Having once received the offloading command at the UE 10 enables fast switching between the macro cell 1 and the small cell 2 without the use of a conventional handover command and also without a need for measurement reporting. In a simplest form the offloading command can be a modified version of an applicable handover command with some additional information field or fields that indicate the need for the additional content storing requirements.

In some embodiments the UE 10 can rapidly switch between the cells without being required to execute a random access (RA) procedure to perform synchronization since information on the UL timing of the two cells is stored. This may depend on whether a time alignment timer (TAT) has expired.

There may also be present one or more scheduled/periodic gaps used for maintaining synchronization to the inter-frequency macro cell 1 during the offload period (or vice versa), or for receiving other control information from the macro cell 1 (or from the small cell). If these synchronization/control gap periods are not used then a conventional random access (RA) procedure can be used to re-synchronize the UE 10 to the macro cell 1 (e.g., to the eNB 12).

Still referring to FIG. 1, in one illustrative example an implementation can entail the following.

The UE/network uses, for example, Event A4 measurement reporting (Event A4 is defined in LTE as 'neighbor becomes offset better than threshold') for controlling when the offload command is valid. An Event A4 enter condition reported by the UE 10 can be used for allowing/informing the network when to use the offload command. The network can, by signaling, inform the UE 10 as to a value for at least one of the 'offset' and the 'threshold' associated with the Event A4. The offload command can then be re-used as needed so long as an A4 leave condition is not reported by the UE 10. The A4 leave condition is used for UE/network to know when it is no longer suitable to use the offload command (to invalidate the currently active offload command.) In general the A4 leave condition could be when the 'neighbor becomes offset less than threshold', or it could be based on some other received signal strength or received signal quality condition or conditions.

When the UE 10 sends the A4 enter condition event to the eNB 12 the network may use the small cell 2 that triggered the Event A4 from the UE 10 as a potential candidate for offloading since the network has been informed by the UE 10 that the reported small cell 2 is 'good enough' for at least offloading usage.

An indication that a current offload command is no longer valid may be explicitly signaled to the UE 10 by the network.

The network can use the offloading command to the small cell 2 whenever needed (e.g., whenever data transmission starts). The network then sends the offloading command and UE 10 changes cells accordingly.

As the UE 10 context information is available in both cells (macro and small) any subsequent offload commands can be lightweight in nature and would not need to use a handover command.

It is within the scope of these embodiments of the invention to use another lightweight radio resource control (RRC) command or even a medium access control (MAC) level command for conveying the offloading command. This is true because subsequent offloading commands into the same small cell can be lighter and faster as the connection context is essentially preserved and ready to use.

Due at least to the challenges related to efficient power savings in the UE 10 and in ensuring mobility robustness it may be beneficial to return the UE 10 to the macro cell 1 as soon as the data transfer has ended. The conditions needed to return to the macro cell could be based on, for example, a legacy condition such as signal level; or on a no data condition (data transfer becomes inactive for a given period of time); or it could be based on a network decision considering one or more of the above conditions and signaling an un-offload/onload command to the UE 10; or is could be based on a UE 10 autonomous decision considering one or more of the above conditions.

A return to the macro cell 1 can be UE 10 initiated or autonomous (as the UE 10 context is available in the macro cell 1). For example, a UE return to the macro cell 1 could be based on an offloading time/total offloading time, e.g., as measured from when the offloading command is first or last used (i.e., the offloading period can be time limited); or the UE 10 can seamlessly (i.e., without a HO command) return back to the macro cell 1 from the small cell 2.

As the cell change is time synchronized between the UE 10 and the network (e.g., eNB 12) there is in principle no actual need to signal anything between the UE 10 and the network, but this could be followed by signaling either in the small cell 2 or in the macro cell 1.

This type of behavior can result in, for example, the use of one in-bound (to the small cell 2) HO command with no need for an outbound HO command when exiting the small cell. This type of behavior can also result in mobility between the same the macro cell 1 and small cell 2 (either direction) being accomplished more efficiently and more rapidly than would be otherwise possible if conventional HO command(s) and HO procedures were to be used.

There are multiple benefits that can be achieved by the use of the exemplary embodiments of this invention.

For example, for those cases with a fast moving UE 10 using the small cell 2 a RLF could be triggered. If this were to occur the target cell to re-establish the radio link would already be known by the UE 10, and the prior context of the UE 10 has been stored by the eNB 12. In some example embodiments, the UE 10 first tries connection re-establishment to the macro cell (or small cell) associated with the offloading command.

Further by example, if no (or minimal, i.e., limited sleep opportunities) DRX is used in the small cell 2 this can have a severe impact on the UE 10 power consumption. While it may be possible to quickly release the connection using conventional techniques this would potentially increase the signaling load of the UE 10 (and the network), and thus also negatively affect the UE 10 power consumption. In accordance with the embodiments of this invention the UE 10 can be quickly transitioned from the small cell 2 back to the macro cell 1 where the power conserving DRX procedure can be initiated as soon as the data transmission from or to the UE 10 has ended.

As another advantage it becomes possible to have a lighter handover procedure and messaging procedure (e.g., as there is no need for measurement reporting). The offloading command (offloading handover message) can be simplified as well since the target cell is already known and the UE 10 has stored all relevant connection-related information for the small cell 2 (as well as for the macro cell 1).

As yet another advantage it becomes possible to increase the mobility robustness by relying on macro cell 1 mobility procedures during UE 10 idle periods (e.g., DRX periods), whereas if the embodiments of this invention were not used the UE 10, when involved with the small cell 2 mobility, would likely be relying on no DRX or very short DRX periods in order to preserve mobility robustness, thereby increasing the UE power consumption (or the likelihood of experiencing a RLF if using long DRX periods in the small cell).

Figure 2:
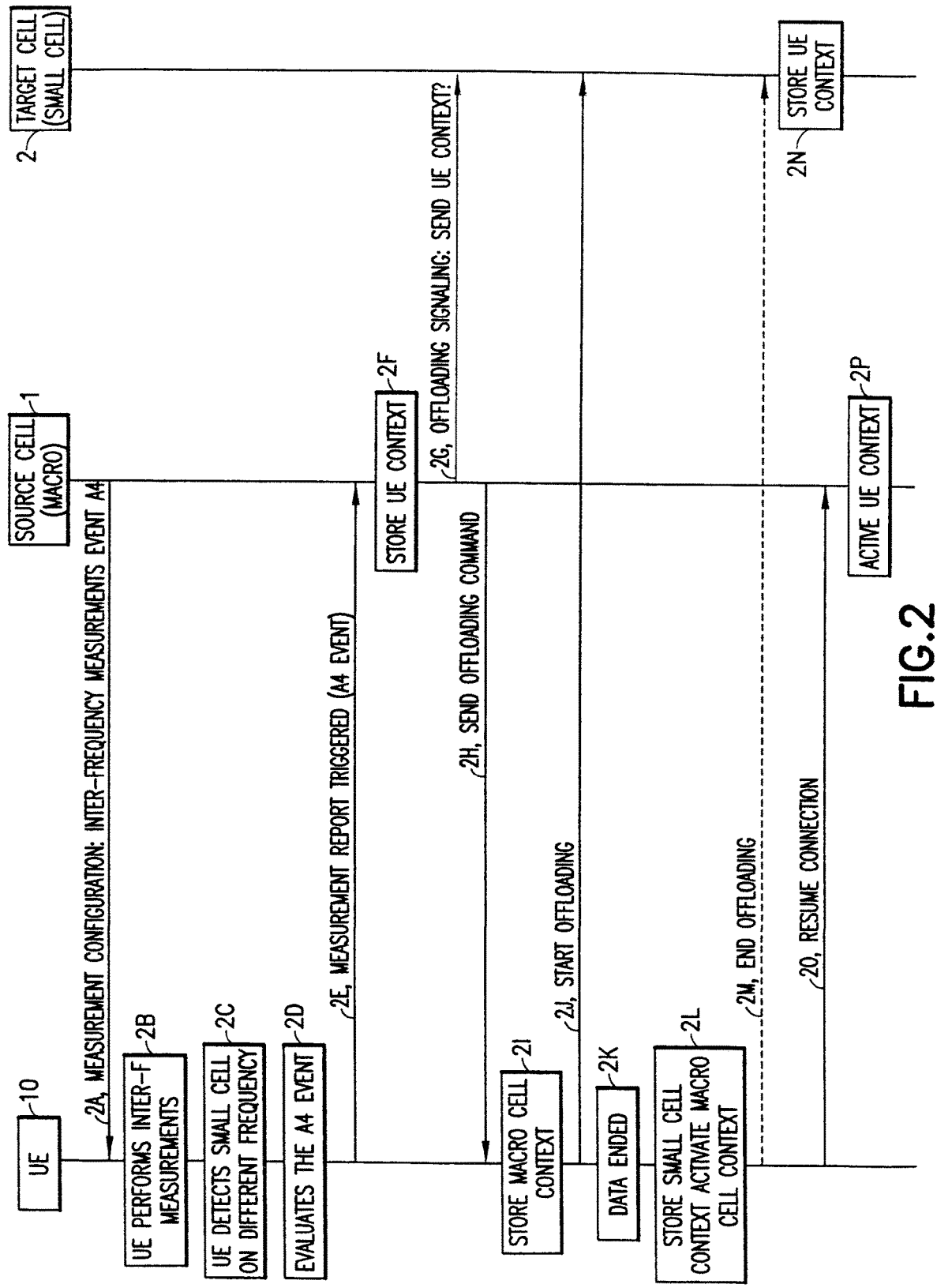
FIG. 2 shows an exemplary message sequence chart that is descriptive of the operation of an offloading command procedure in accordance with embodiments of this invention.

FIG. 2 shows an exemplary message sequence chart that is descriptive of the operation of the offloading command procedure.

At 2A the UE 10 is configured in the macro cell 1 (source cell) to perform inter-frequency measurements. This could occur, for example, at point A in FIG. 1 when the UE 10 enters the macro cell 2.

At 2B the UE 10 performs inter-frequency measurements.

At 2C the UE 10 detects the small cell 2 on another frequency. For example this could occur at the 'A4 enter condition' shown in FIG. 1.

At 2D and 2E the UE 10 is configured to evaluate the A4 event and to trigger measurement reporting to inform the network (e.g., the eNB 12) that the UE 10 has detected the small cell 2 and that the measured signal is above a threshold set for triggering reporting.

At 2F the eNB 12 makes a decision to send an offloading command to the UE 10 and stores the current UE 10 context. The eNB 12 can make the decision to send the offloading command based on one or more of several possible existing conditions. For example, the eNB 12 can become aware of downlink (DL) packet traffic that is queued or queuing in the network for the UE 10. In this case the decision can be based on the amount of queued DL traffic, where if the queued DL traffic is less than some threshold amount the traffic can be sent to the UE 10 without initiating the offloading operation with the sending of the offloading command. Related to this can be the nature of the DL traffic. For example, if the queued traffic is the beginning portion of streamed traffic (e.g., streamed video or audio data) the eNB 12 may simply initiate the offloading operation, whereas if the queued traffic is not identified as streaming traffic then the eNB 12 may simply download the traffic to the UE 10 without initiating the offloading operation. Additionally the network may also base the decision to send an offloading command on knowledge of cell coverage areas, e.g., on knowledge that the small cell is fully within the coverage area of the macro cell. The same considerations can apply when the eNB 12 is informed by the UE 10 that it has uplink (UL) traffic to send e.g. by sending a buffer status report (BSR), and in this case the offloading decision can be based on an amount of UL traffic and/or on the type or nature of the UL traffic that the UE 10 wishes to transmit. The UE 10 may also signal assistance information to the network indicating whether it would need offloading or benefit from offloading (e.g., via offloading command, secondary cell configuration/activation or a regular handover). This assistance information may be based on, e.g., knowledge of a certain application or type of application running in the device, or it can be based on other information such as information related to a current or a predicted usage of the device that would benefit from offloading (e.g., knowledge of high traffic activity starting, or knowledge of the UE 10 movement/speed or whether it is stationary). Similarly there can be an assistance indication of when the UE 10 would not benefit from offloading, e.g., because of high speed or a lack of user data activity.

At 2G the eNB 12 can perform offloading signaling with the target cell (small cell 2 AP 20). This could possibly involve the eNB 12 also sending the UE 10 context to the small cell 2.

At 2H, while the UE 10 is within the coverage area of the small cell 2, the network may send the offloading command (once or repeatedly as described above) to the UE 10.

At 2I, in response to the first receipt of the offloading command the UE 10 stores the current applicable context associated with the source macro cell 1.

At 2J the UE 10 can obtain, if not already stored, the context associated with the target small cell 2 and initiate a data transfer offloading operation using the AP 20 of the small cell 2.

At 2K the data transfer offloading procedure terminates.

At 2L the UE 10 stores the current context of the target small cell 2 and activates the stored context of the source macro cell 1.

At 2M the UE 10 may optionally signal the small cell 2 of the end of the current offloading procedure.

At 2N the AP 20 of the small cell 2 stores the current context of the UE 10 with respect to its connectivity with the small cell 2.

At 2O the UE 10 can signal the macro cell 1 that it is ready to resume the previous connection.

At 2P the eNB 12 of the macro cell 1 retrieves the UE 10 context that was stored at 2G and activates the context, thereby once again entering the connected state with the UE 10.

At some point, e.g., at the 'A4 leaving condition' shown in FIG. 1, the UE 10 sends another measurement report to the network to inform the network that the UE 10 is no longer within the coverage area of the small cell 2. This assumes that the UE 10 has not become stationary within the coverage area of the small cell 2.

During the period between 2H and 2P the network can use and re-use the offloading command and procedures (storing the macro and small cell and UE context information as needed) for achieving fast switching between the macro cell 1 and the small cell 2.

During the period between 2I and 2L the UE 10 may not need to enter the DRX mode of operation, as it is possible for the UE 10 to re-establish the connection with the source macro cell 1 almost immediately upon the data offloading procedure being terminated.

The offloading command can be used as well for the intra-frequency case (co-channel deployment), where macro and small cell(s) are deployed on the same carrier frequency. In this case, the procedure is similar as explained in the above example, except that there is no need for the inter-frequency measurements where the UE 10 measures the small cell. However, due to potential interference issues in the co-channel case, a time division multiplex (TDM) mechanism can be used for coordinating interference between the overlapping small cell 2 and macro cell 1. This may impose additional restrictions on measurements, e.g., the UE 10 may apply a different measurement configuration for small cells 2 than for macro cells 1 (or they can be considered as different measurement objects). Some event or condition other than the exemplary Event A4 can also be used in this case.

The indication for the need for offloading may be signaled either by the network or by the UE 10. In case the 'offloading need' is signaled by the UE 10, the decision may be taken based on the BSR status or, e.g., new UE assistance information (based on UE knowledge on running applications, user actions, etc.), or by example the UE 10 detecting a nearby small cell. In that case, UE can signal to the network that it would like to be offloaded to the small cell. In response, the network may send the offloading command either immediately or at some later time while the UE's indication is valid. In some cases the network may also ignore UE's signaling, e.g., if there is no appropriate small cell available to offload to, or if a potentially available small cell is overloaded.

In case the 'offloading need' is sent by the network, the decision about the offloading and therefore sending the offloading command information to the UE 10 may be taken based on the latest BSR information from the UE 10 and/or on the DL UE buffer status.

Offloading can occur as well if the small cell fulfills some quality criteria, e.g., the reference signal received quality (RSRQ) level of the small cell is higher than a threshold, or the reference signal received power (RSRP) level of the small cell is higher than a threshold. The network may obtain information of the signal quality from the measurement reports received form the UE 10.

In case there is a handover from the small cell to another cell during the data offloading, and when the offloading command is used, the UE 10 may continue to store the macro cell connection context so that offloading can continue in the new small cell. The network may indicate this, e.g., in the handover signaling. This could be used, e.g., also when the new small cell is within the coverage area of the same macro cell. Similarly a handover from one macro cell to another could maintain the same offloading small cell. This could be the case, e.g., when the two macro cells have approximately the same coverage area, but are on different frequencies or carriers.

Figure 3:
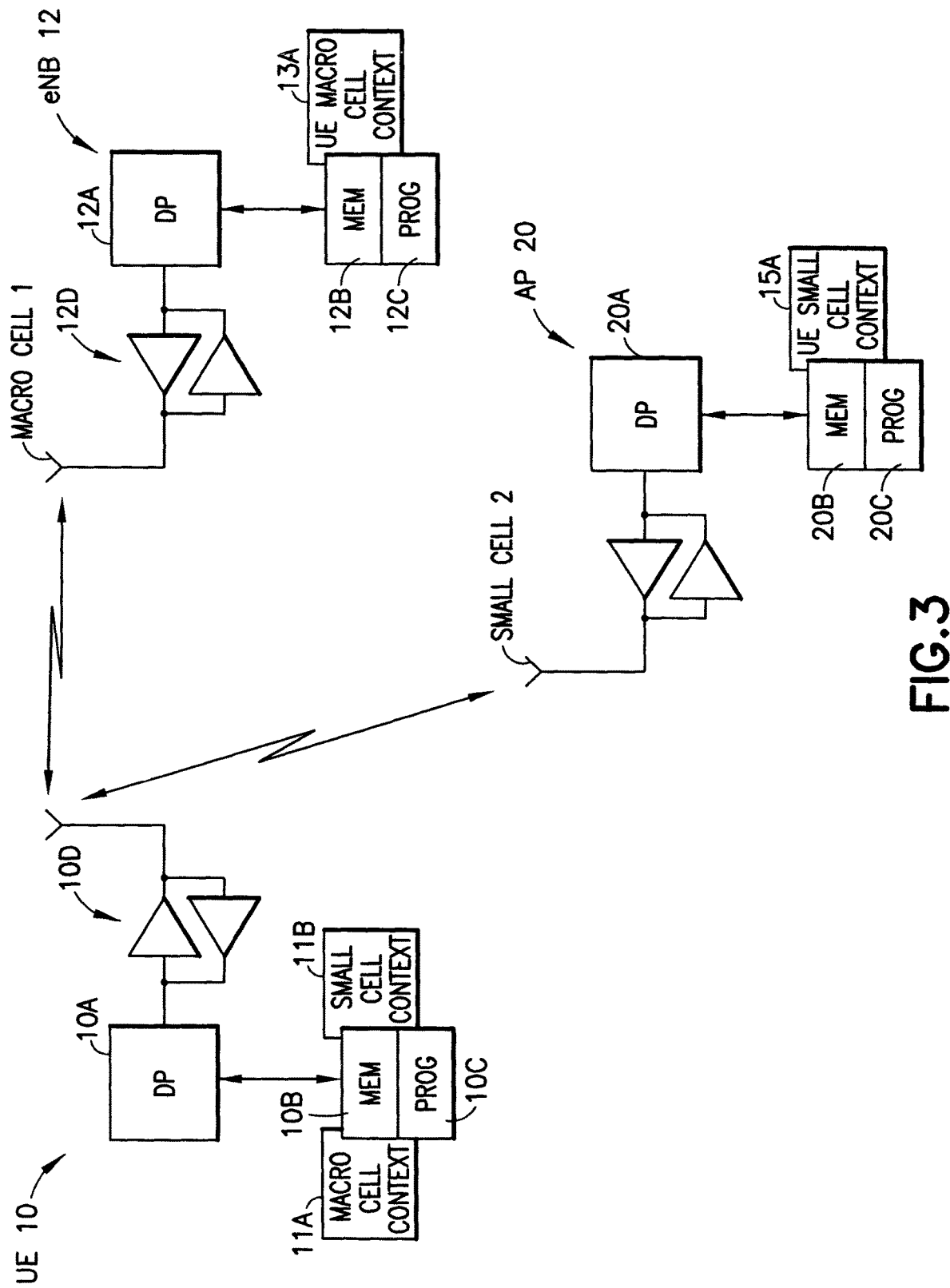
FIG. 3 shows a simplified block diagram of various electronic devices that are suitable for use in practicing the exemplary embodiments of this invention.

FIG. 3 illustrates a simplified block diagram of various electronic devices and apparatus that are suitable for use in practicing the exemplary embodiments of this invention. In FIG. 3 an apparatus, such as a mobile communication device which may be referred to as the UE 10 communicates with a network access node, such as a NodeB (base station), and more specifically with the eNB 12 (in a non-limiting case of an LTE embodiment). The eNB 12 establishes the macro cell 1 shown in FIG. 1. Also shown is the AP 20 that establishes the small cell 2 shown in FIG. 1, where the small cell 2 can be considered to be at least partially contained within the coverage area of the macro cell 1.

The UE 10 includes a controller, such as at least one computer or a data processor (DP) 10A, at least one non-transitory computer-readable memory medium embodied as a memory (MEM) 10B that stores a program of computer instructions (PROG) 10C, and at least one suitable radio frequency (RF) transmitter and receiver pair (transceiver) 10D for bidirectional wireless communications with the eNB 12 via one or more antennas.

The eNB 12 also includes a controller, such as at least one computer or a data processor (DP) 12A, at least one computer-readable memory medium embodied as a memory (MEM) 12B that stores a program of computer instructions (PROG) 12C, and at least one suitable RF transceiver 12D for communication with the UE 10 via one or more antennas (typically several when multiple input/multiple output (MIMO) operation is in use). The eNB 12 can be coupled via a data/control path (not shown) to a core network (CN) such as an evolved core network. The path may be implemented as an S1 interface in the LTE system, and the eNB 12 may also be coupled to another eNB (not shown) via another data/control path which may be implemented as an X2 interface in the LTE system.

The AP 20 also includes a controller, such as at least one computer or a data processor (DP) 20A, at least one computer-readable memory medium embodied as a memory (MEM) 20B that stores a program of computer instructions (PROG) 20C, and at least one suitable RF transceiver 20D for communication with the UE 10 via one or more antennas. The AP 20 can be assumed to be connected to some type of backhaul network (not shown) whereby data can be transferred to and from the UE 10.

For the purposes of describing the exemplary embodiments of this invention the memory 10B of the UE 10 may be assumed to store during operation information descriptive of the macro cell context 11A and information descriptive of the small cell context 11B.

For the purposes of describing the exemplary embodiments of this invention the memory 12B of the eNB 12 may be assumed to store during operation information descriptive of the UE context 13A with respect to the macro cell 1.

For the purposes of describing the exemplary embodiments of this invention the memory 20B of the AP 20 may also be assumed to store during operation information descriptive of the UE context 15A with respect to the small cell 2.

The program 10C is assumed to include program instructions that, when executed by the associated DP 10A, enable the UE 10 to operate in accordance with the exemplary embodiments of this invention so as to, for example, respond to the Event A4, send a report to the macro cell 1, receive the offloading command, store the macro cell context 11A and the small cell context 11B, re-load an applicable context as needed to re-establish connectivity with one of the eNB 12 and the AP 20, and to perform the other operations detailed above.

The program 12C is assumed to include program instructions that, when executed by the associated DP 12A, enable the eNB 12 to operate in accordance with the exemplary embodiments of this invention so as to, for example, respond to the report sent by the UE 10, to transmit the offloading command to the UE 10, to store the UE 10 context 13A, and to re-load the UE 10 context as needed to re-establish connectivity with the UE 10 and to perform the other operations detailed above.

The program 20C is assumed to include program instructions that, when executed by the associated DP 20A, enable the AP 20 to operate in accordance with the exemplary embodiments of this invention so as to, for example, store the UE 10 context 15A, and to re-load the UE 10 context as needed to re-establish connectivity with the UE 10 and to perform the other operations detailed above.

The exemplary embodiments of this invention may be implemented at least in part by computer software executable by the DP 10A of the UE 10 and by the DP 12A of the eNB 12 and by the DP 20A of the AP 20, or by hardware, or by a combination of software and hardware (and firmware).

The various data processors, memories, programs, transceivers and interfaces depicted in FIG. 3 can all be considered to represent means for performing operations and functions that implement the several non-limiting aspects and embodiments of this invention. As should thus be appreciated the details of the construction of these various devices can vary widely and, in many cases, can be implementation-specific. Further, it should be appreciated that the several devices, components, sub-systems and the like depicted in FIG. 3, separately and in combination, may be viewed as representing various means for implementing the exemplary embodiments of this invention.

In general, the various embodiments of the UE 10 can include, but are not limited to, cellular mobile devices, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer-readable memories 10B, 12B and 20B may be of any type suitable to the local technical environment and may be implemented using any suitable data storage technology, such as semiconductor based memory devices, random access memory, read only memory, programmable read only memory, flash memory, magnetic memory devices and systems, optical memory devices and systems, fixed memory and removable memory. The data processors 10A, 12A and 20A may be of any type suitable to the local technical environment and may include one or more of general purpose computers, special purpose computers, microprocessors, digital signal processors (DSPs) and processors based on multi-core processor architectures, as non-limiting examples.

One clear advantage that is bestowed by the use of the embodiments of this invention is that an efficient and robust mobility operation is made possible for at least those cases where the pico cell 2 outbound mobility would otherwise be unsuccessful.

Another clear advantage that is bestowed by the use of the embodiments of this invention is that a lighter, more efficient and lower latency signaling scheme than a conventional hard handover signaling scheme can be employed thereby conserving network radio signaling bandwidth and core network signaling load and reducing UE power consumption. The low latency and fast offloading serves to improve the overall network efficiency.

Figure 4:
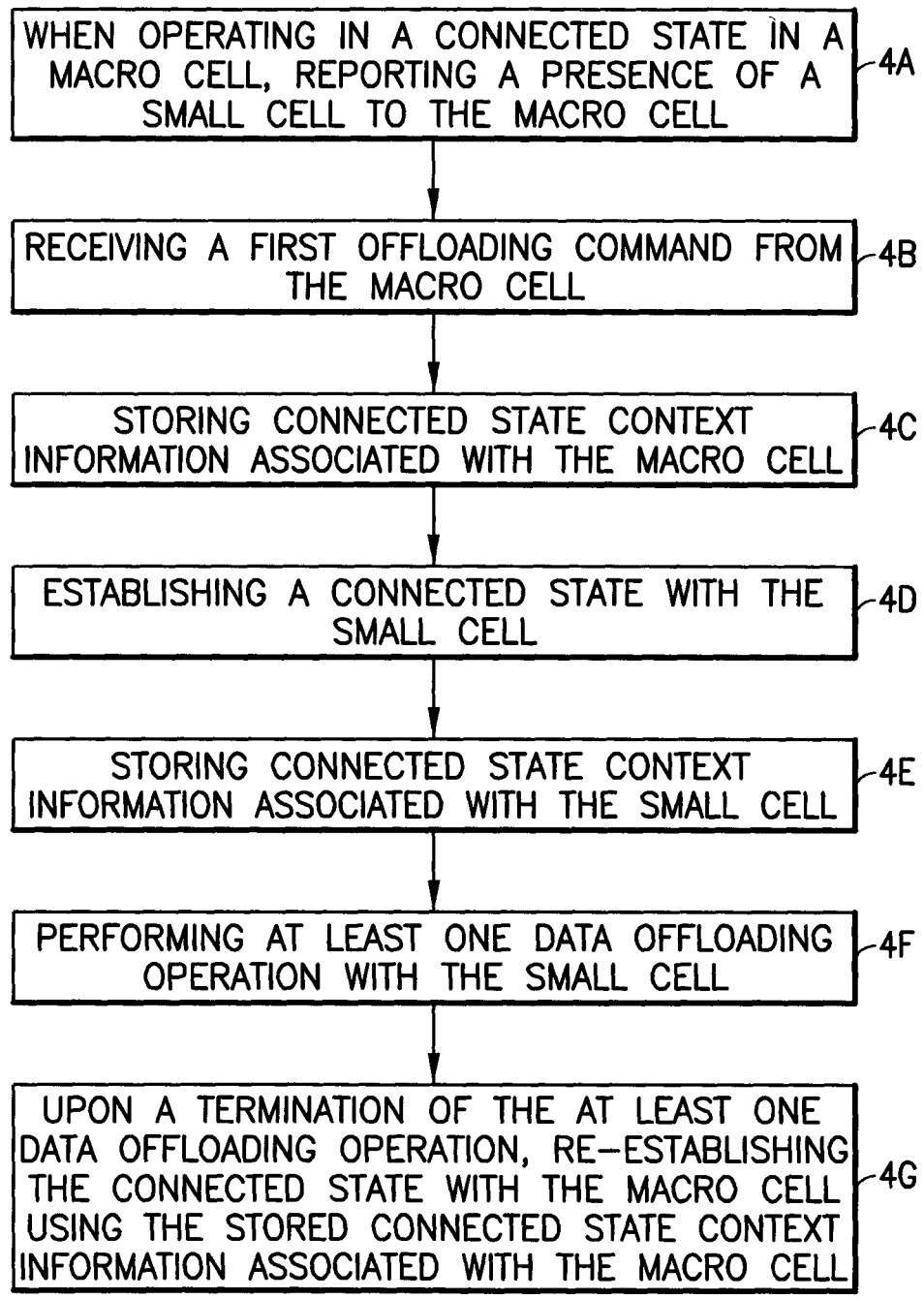
FIG. 4 is a logic flow diagram that illustrates the operation of a method, and a result of execution of computer program instructions, by a user equipment in accordance with the exemplary embodiments of this invention.

FIG. 4 is a logic flow diagram that illustrates the operation of a method, and a result of execution of computer program instructions, in accordance with the exemplary embodiments of this invention. In accordance with these exemplary embodiments a method may perform, at Block 4A, a step when operating in a connected state in a first cell, such as a macro cell, of reporting a presence of a second cell, such as a small cell, to the macro cell. Note that this step shown in Block 4A could be considered as an optional step in some cases since the network associated with the first (macro) cell could learn by other means that the UE 10 is near to and can be connected with the second (small) cell. At Block 4B there is a step of receiving a first offloading command from the macro cell. At Block 4C there is a step of storing connected state context information associated with the macro cell. At Block 4D there is a step of establishing a connected state with the small cell. At Block 4E there can be a step of storing connected state context information associated with the small cell. At Block 4F there is a step of performing at least one data offloading operation, such as one of transmitting and receiving data, with the small cell.

At Block 4G there may be a step performed, upon a termination of the at least one data offloading operation, of re-establishing the connected state with the macro cell using the stored connected state context information associated with the macro cell. Note that this step at Block 4G could be considered as being an optional step, as the user equipment could be, by example, transitioned instead to the Idle mode after the connection to the small cell ends, or there could be, for example, a handover to another small cell that is performed instead of re-establishing the connected state with the first (macro) cell.

Figure 5:
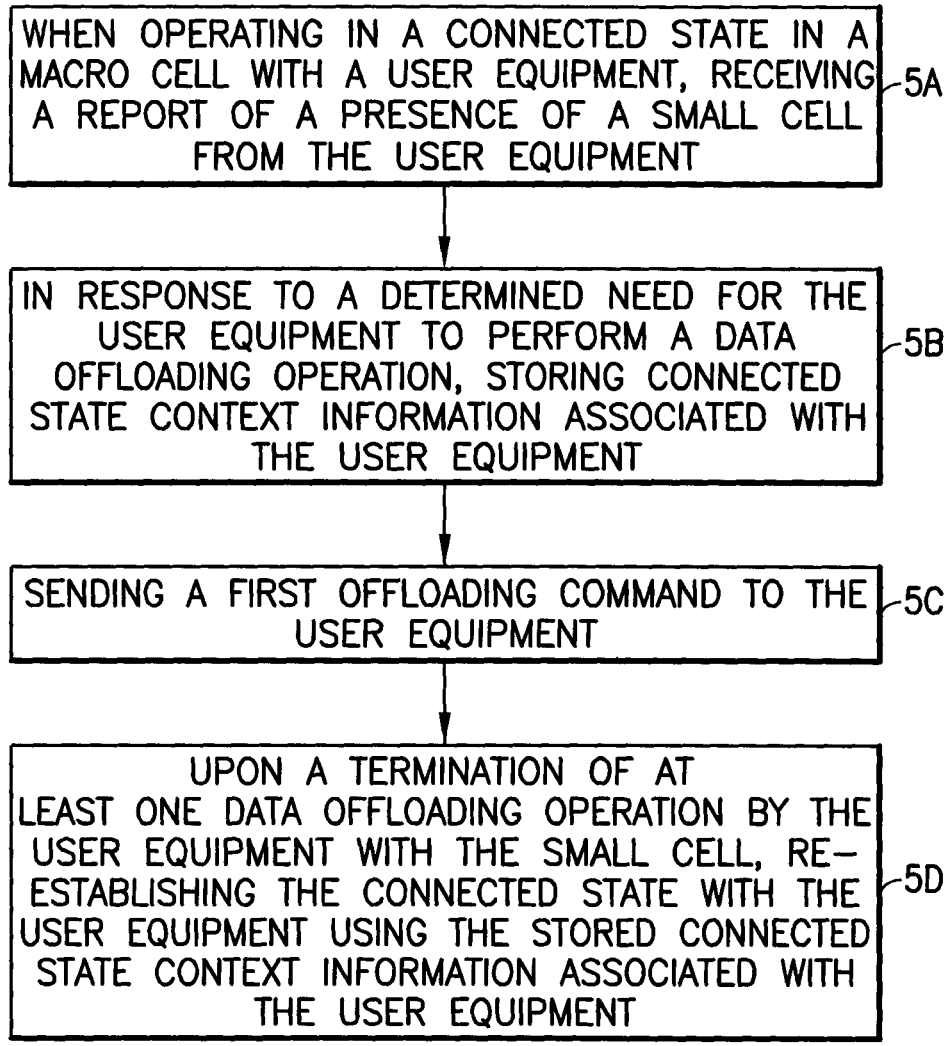
FIG. 5 is a logic flow diagram that illustrates the operation of a further method, and a result of execution of computer program instructions, by a macro cell access node, such as an eNB, in accordance with the exemplary embodiments of this invention.

FIG. 5 is a logic flow diagram that illustrates the operation of a method, and a result of execution of computer program instructions, in accordance with the exemplary embodiments of this invention. In accordance with these exemplary embodiments a method performs, at Block 5A, a step when operating in a connected state in a macro cell with a user equipment of receiving a report of a presence of a small cell from the user equipment. At Block 5B there is a step performed, in response to a determined need for the user equipment to perform a data offloading operation, of storing connected state context information associated with the user equipment. At Block 5C there is a step of sending a first offloading command to the user equipment. At Block 5D there is a step performed, upon a termination of at least one data offloading operation by the user equipment with the small cell, of re-establishing the connected state with the user equipment using the stored connected state context information associated with the user equipment.

Figure 6:
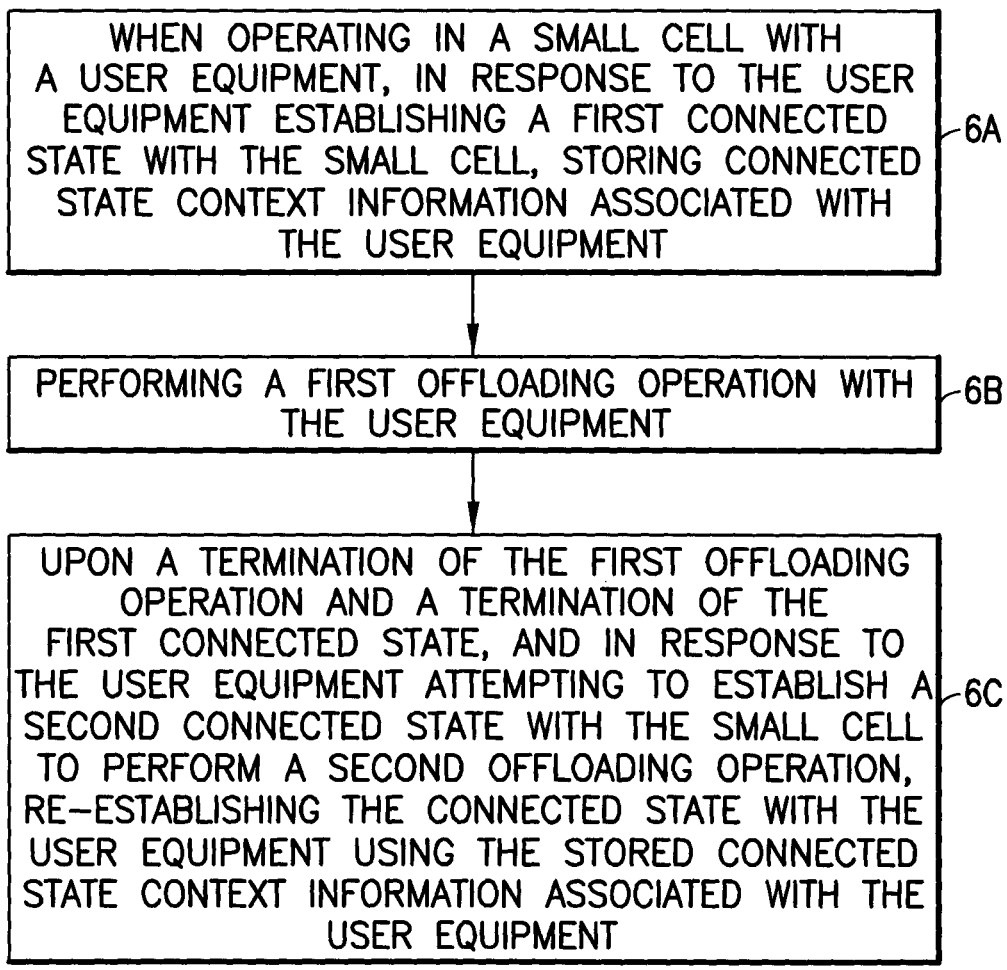
FIG. 6 is a logic flow diagram that illustrates the operation of another method, and a result of execution of computer program instructions, by a small cell access node in accordance with the exemplary embodiments of this invention.

FIG. 6 is a logic flow diagram that illustrates the operation of a method, and a result of execution of computer program instructions, further in accordance with the exemplary embodiments of this invention. In accordance with these exemplary embodiments a method performs, at Block 6A, a step when operating in a small cell with a user equipment in response to the user equipment establishing a first connected state with the small cell, of storing connected state context information associated with the user equipment. At Block 6B there is a step of performing a first offloading operation with the user equipment. At Block 6C there is a step performed, upon a termination of the first offloading operation and a termination of the first connected state, and in response to the user equipment attempting to establish a second connected state with the small cell to perform a second offloading operation, of re-establishing the connected state with the user equipment using the stored connected state context information associated with the user equipment.

The various blocks shown in FIGS. 4, 5 and 6 may be viewed as method steps, and/or as operations that result from operation of computer program code, and/or as a plurality of coupled logic circuit elements constructed to carry out the associated function(s). In these Figures and in method claims at least certain of the steps could be performed in other than the recited order without deviating from the teachings of this invention.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above at least in part in the context of the evolved universal terrestrial radio access network (E-UTRAN) and the UTRAN-LTE system it should be appreciated that the exemplary embodiments of this invention are not limited for use with only this one particular type of wireless communication system, and that they may be used to advantage in other wireless communication systems such as in for example UTRAN and GSM type systems. In addition at least certain aspects of the embodiments of this invention can be used with WiFi access nodes where the small cell is a WiFi hotspot.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described events, parameters and message names (e.g., Event A4, TAT, BSR, offloading command, etc.) are not intended to be limiting in any respect, as these events, parameters and messages can be identified by any suitable names. Further, the various names assigned to different types of cells and cell access equipment (e.g., macro cell, small cell, pico cell, eNB, AP, etc.) are not intended to be limiting in any respect since these various types of cells and cell access equipment may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
receiving, at a user equipment, a first offloading command from a first cell comprising a macro cell, when operating in a first connected state in the first cell;
storing, by the user equipment and in response to the first offloading command, first connected state context information associated with the first cell to configure the user equipment to return to the first cell;
establishing, by the user equipment, a second connected state with a second cell comprising a small cell at least having a partial overlap in coverage with the first cell;
storing, by the user equipment, second connected state context information associated with the second cell to configure the user equipment to return to the second cell;
performing, by the user equipment, at least one data offloading attempt comprising at least one of transmitting and receiving data with the second cell while still maintaining a connection with the first cell; and
returning, by the user equipment and upon a termination of the at least one data offloading attempt with the second cell, to the first connected state with the first cell without a handover command, wherein the returning comprises applying the stored first connected state context information associated with the first cell.

2. The method of claim 1, further comprising:
transitioning, by the user equipment and in response to an indication of at least one additional data offloading operation for the user equipment, to the second connected state with the second cell, wherein the transitioning comprises applying the stored second connected state context information associated with the second cell.

3. The method of claim 1, wherein the first connected state with the first cell occurs during idle periods of the user equipment, and wherein the second connected state with the second cell occurs during active downlink and uplink operations between the user equipment and the second cell.

4. The method of claim 1, further comprising reporting, by the user equipment, presence of the second cell to the first cell.

5. The method of claim 4, wherein reporting the presence of the second cell is performed in response to performing, by the user equipment, at least one of intra-frequency and inter-frequency measurements and further in response to an event A4 condition being fulfilled.

6. An apparatus, comprising:
at least one processor; and
at least one memory including computer program code, the at least one memory and the computer program code configured to, with the at least one processor, cause the apparatus to at least:
receive a first offloading command from a first cell comprising a macro cell, when operating in a first connected state in the first cell;
store, in response to the first offloading command, first connected state context information associated with the first cell to configure the apparatus to return to the first cell;
establish a second connected state with a second cell comprising a small cell at least having a partial overlap in coverage with the first cell;

store second connected state context information associated with the second cell to configure the apparatus to return to the second cell;

perform at least one data offloading attempt comprising at least one of transmitting and receiving data with the second cell while still maintaining a connection with the first cell; and return, upon a termination of the at least one data offloading attempt with the second cell, to the first connected state with the first cell without a handover command, wherein the return comprises application of the stored first connected state context information associated with the first cell.

7. The apparatus of claim 6, wherein the apparatus is further caused to at least:

transition, in response to an indication of at least one additional data offloading operation for the apparatus, to the second connected state with the second cell, wherein the transition comprises application of the stored second connected state context information associated with the second cell.

8. The apparatus of claim 6, wherein the first connected state with the first cell occurs during idle periods of the apparatus, and wherein the second connected state with the second cell occurs during active downlink and uplink operations between the apparatus and the second cell.

9. The apparatus of claim 6, the wherein the apparatus is further caused to at least report a presence of the second cell to the first cell.

10. The apparatus of claim 9, wherein the report of the presence of the second cell is in response to one of intra-frequency and inter-frequency measurements and further in response to an event A4 condition being fulfilled.

11. A method, comprising:

receiving, from a user equipment and by a network node of a macro cell, a report of a presence of a small cell at least having a partial overlap in coverage with the macro cell, when operating in a first connected state with the user equipment in the macro cell;

storing, by the network node, in response to a determined need for the user equipment to perform a data offloading attempt with the small cell, connected state context information associated with the user equipment;

sending, by the network node, a first offloading command to the user equipment, wherein the network node maintains a connection with the user equipment during the offloading attempt with the small cell;

in response to termination of at least one data offloading attempt between the user equipment and the small cell and upon the small cell storing the connected state context information associated with the user equipment, returning, by the network node, to the first connected state with the user equipment using the stored connected state context information and without a handover command; and sending, by the network node, in response to a subsequent determined need for the user equipment to perform an additional data offloading attempt with the small cell, a second offloading command to the user equipment.

12. The method of claim 11, wherein the first connected state with the macro cell occurs during idle periods of the user equipment.

13. The method of claim 11, where receiving the report of the presence of the small cell is performed in response to an Event A4 condition being fulfilled at the user equipment.

14. The method of claim 11, where receiving the report of the presence of the small cell is performed in response to instructing the user equipment to perform one of intra-frequency and inter-frequency measurements.

15. An apparatus, comprising:

at least one processor; and at least one memory including computer program code, the at least one memory and the computer program code configured to, with the at least one processor, cause the apparatus to at least:

receive from a user equipment a report of a presence of a small cell at least having a partial overlap in coverage with a macro cell, when operating in a first connected state in the macro cell with the user equipment;

store, in response to a determined need for the user equipment to perform a data offloading attempt with the small cell, connected state context information associated with the user equipment;

send a first offloading command to the user equipment, wherein the apparatus maintains a connection with the user equipment during the offloading attempt with the small cell;

in response to termination of at least one data offloading attempt between the user equipment and the small cell and upon the small cell storing the connected state context information associated with the user equipment, return to the first connected state with the user equipment using the stored connected state context information and without a handover command; and send, in response to a subsequent determined need for the user equipment to perform an additional data offloading attempt with the small cell, a second offloading command to the user equipment.

16. The apparatus of claim 15, wherein the first connected state with the macro cell occurs during idle periods of the user equipment.

17. The apparatus of claim 15, wherein receipt of the report of the presence of the small cell is in response to an Event A4 condition being fulfilled at the user equipment.

18. The apparatus of claim 15, wherein receipt of the report of the presence of the small cell is in response to an instruction by the apparatus to the user equipment to perform one of intra-frequency and inter-frequency measurements.

* * * * *